(12) United States Patent
Unruh

(10) Patent No.: US 10,967,311 B1
(45) Date of Patent: Apr. 6, 2021

(54) IRRIGATION WATER FILTERING SYSTEM AND METHOD OF USE

(71) Applicant: Marshal Unruh, Deerfield, KS (US)

(72) Inventor: Marshal Unruh, Deerfield, KS (US)

( * ) Notice: Subject to any disclaimer, the term of this patent is extended or adjusted under 35 U.S.C. 154(b) by 0 days.

(21) Appl. No.: 16/671,884

(22) Filed: Nov. 1, 2019

Related U.S. Application Data

(60) Provisional application No. 62/754,067, filed on Nov. 1, 2018.

(51) Int. Cl.
| | |
|---|---|
| *B01D 35/05* | (2006.01) |
| *B01D 33/073* | (2006.01) |
| *E03B 3/04* | (2006.01) |
| B01D 33/327 | (2006.01) |
| B01D 29/05 | (2006.01) |

(52) U.S. Cl.
CPC .......... *B01D 35/05* (2013.01); *B01D 33/073* (2013.01); *E03B 3/04* (2013.01); *B01D 29/055* (2013.01); *B01D 35/08* (2013.01); *B01D 2201/208* (2013.01)

(58) Field of Classification Search
CPC ...... B01D 33/073; B01D 33/72; B01D 35/05; B01D 35/08; B01D 2201/208; E03B 3/04
USPC ........ 210/122, 170.05, 170.09, 170.1, 242.1, 210/747.6; 405/127
See application file for complete search history.

(56) References Cited

U.S. PATENT DOCUMENTS

| | | | | |
|---|---|---|---|---|
| 4,017,394 A | * | 4/1977 | Hensley ............... | B01D 33/073 210/242.1 |
| 6,270,669 B1 | * | 8/2001 | Bauer .................... | B01D 35/05 210/242.1 |
| 7,794,589 B2 | * | 9/2010 | Kozey ................... | B01D 35/05 210/242.1 |
| 7,938,957 B2 | * | 5/2011 | Bolan ...................... | E03B 3/04 210/242.1 |
| 8,652,324 B2 | * | 2/2014 | Wietharn ............... | B01D 35/05 210/170.05 |

* cited by examiner

*Primary Examiner* — Christopher Upton
(74) *Attorney, Agent, or Firm* — Richard Eldredge; Leavitt Eldredge Law Firm

(57) ABSTRACT

A water filtering system includes a support with pontoons to provide buoyancy and a suction pipe; a plate connected to the pontoons and suction pipe; and a wheel bearing shaft. A venturi system includes a venturi suction pipe and a discharge pipe. A screen assembly to engage with the plate around the venturi system, having a filter drum; and a wheel bearing assembly engage with a wheel bearing shaft to secure the screen assembly in place; buckets are mounted to the closed end; and a pump engaged with the suction pipe. The pontoons and the suction pipe extend into the filter drum; water is pulled through the venturi suction pipe and further pushed to the discharge pipe and the split pipe to fall out and into the buckets; the filter drum to rotates; and water is dumped from each of the buckets through the screen.

9 Claims, 5 Drawing Sheets

IRRIGATION WATER FILTERING SYSTEM AND METHOD OF USE

BACKGROUND

1. Field of the Invention

The present invention relates generally to water filtering systems, and more specifically, to a water filtering system with a screen used as a pump intake screen to filter debris from water to be used in irrigation sprinklers or any other device requiring debris-free water.

2. Description of Related Art

Water filtering systems are well known in the art and are effective means to filter water for a variety of uses. For example, there exists water filtering systems, wherein a centrifugal pump is used to pump water from a reservoir/ stream/river or the like, wherein the water is pumped through a filter to remove debris prior to use. These conventional systems have many limitations.

One limitation in current water filtering systems is the need for the addition of floating devices to the overall system to aid in floatation within the reservoir/stream/river. This can be costly, ineffective, and cumbersome.

Another limitation is the need of a screen cleaning assembly in which a high-pressure nozzle is used to pressure wash the screen that provides filtering. Again, this can be costly and ineffective. Further, high pressure nozzles require higher over-all system pressures, burning excess fuel and place unneeded stress on the entire system. Furthermore, high pressure nozzles have small openings that have many tendencies to plug.

Another limitation is that other systems require waterways to be empty for proper installation and maintenance. These systems can even require the use of SCUBA gear, thus making system installation and repairs in high water next to impossible.

Another limitation is in the delivery of the water from the filter to the shoreline. Other floating systems require piping (cut to length) to be supported above the waterline from the filter to the shoreline, limiting the adjustments that can be made. The system of the present invention provides expandability into its features, accommodating any needed adjustments needed because of ever changing conditions, thus making water supplies more reliable. In public water supplies the reliability of a water source during a drought situation can be especially critical.

Additional limitations exist, and accordingly, although great strides have been made in the area of water filtering systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
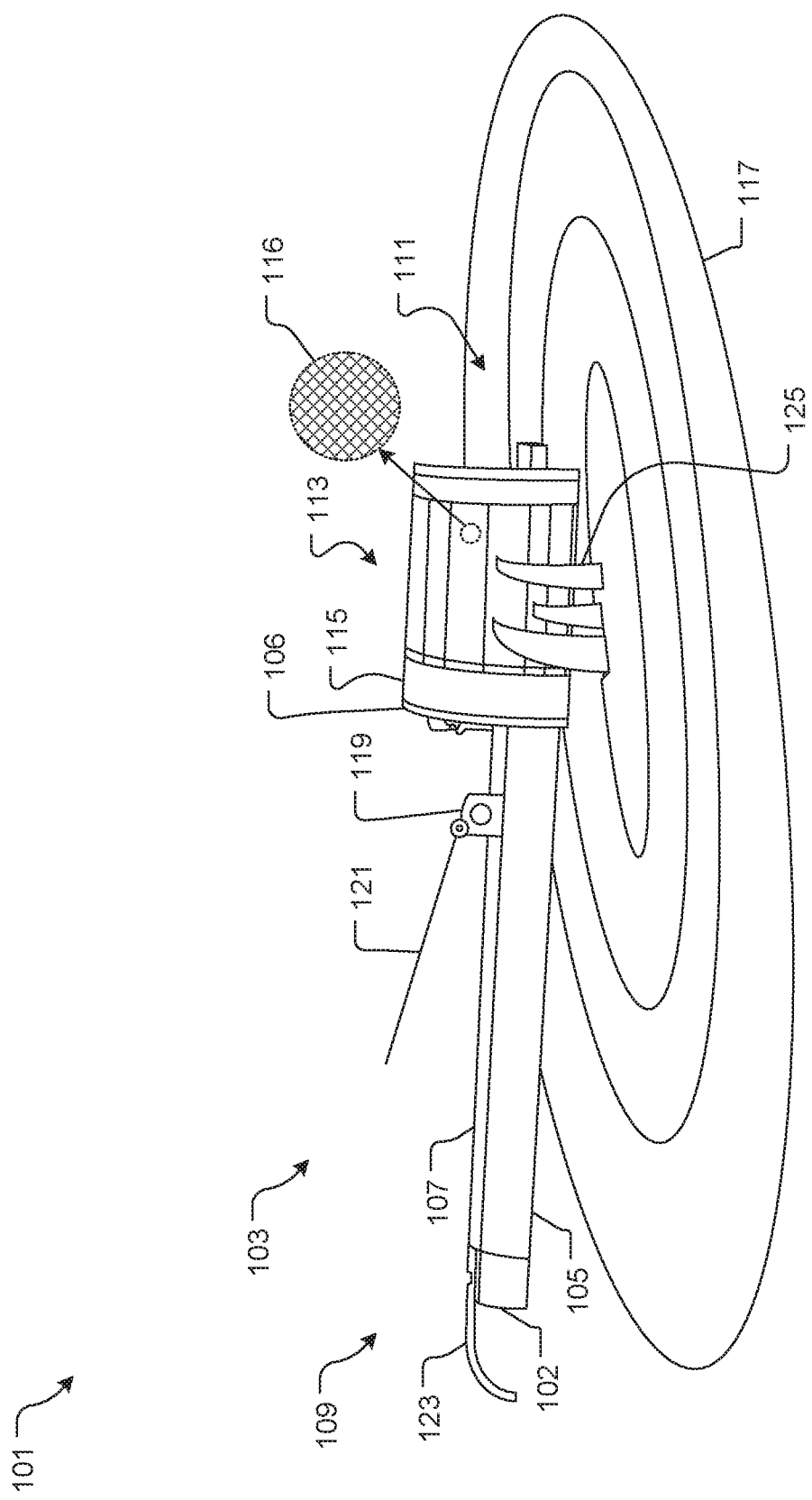
FIG. 1 is an isometric view of a water filtering system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional filtration systems. Specifically, the present invention provides a filtration system having one or more pontoons that provide flotation built into the apparatus and the system further includes a low pressure venturi system configured to flood the screen of a filter drum to clean the filter, as opposed to the use of a high pressure cleaning system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a water filtration system 101 in accordance with a preferred embodiment of the present application. It will be appreciated that system 101 overcomes one or more of the above-listed problems commonly associated with conventional filtration systems.

In the contemplated embodiment, system 101 includes a water filtration apparatus 103 having one or more pontoons 105, 107, extending from a first end 109 (discharge/tail end) to a second end 111 (screen end/intake end). The discharge end can include either an open pipe connection or a flange connection and will have a connection point to be connected to a pump 102. The one or more pontoons 105, 107 are part of a support system configured to provide structural integrity and flotation to the system. The support system further includes a plate 106 configured to provide structural support to a filter system (as will be discussed herein). At the second end 111 is a filtering assembly 113, having a filter drum 115 with a mesh body 116 configured to intake water. The mesh body 116 can vary in size of mesh as desired. In one embodiment, the drum has a 34 inch diameter and is 36 inches long.

During use, the apparatus 103 is rested on top of a water body 117, wherein the pontoons provide floatation. In one embodiment, the one or more pontoons are PVC marine grade foam filled pontoons with a 10 inch diameter and are 10 feet long. A crane or similar machine (not shown) is used to connected to one or more rings 119 (lifting eye/balance point) via a cable 121 or the like to provide for support. During use, water is pulled through filter drum 115 and a venturi system, having a venturi inlet 123 (as will be discussed below) is used to push water 125 through the mesh body 116 for cleaning. It should be appreciated that the drum 115 rotates during use.

One benefit of the present invention is that maintenance on the system can be accomplished easily, even in high water conditions, by simply pulling the system to shore with ropes/cables, and proceeding with maintenance on the shore.

It should be appreciated that the apparatus provides for a screen type system that floats on top of the water, wherein the drum 115 rotates and there is a self cleaning feature that covers the suction end of the apparatus.

As will be discussed in further detail, the system utilizes a venturi system with a plurality buckets mounted to the interior, closed end of the drum 115, wherein the venturi system creates a flooding scenario inside the drum. The buckets are filled via the flooding, which provides for gravitational rotation of the drum, and further provides for cleaning of the mesh body 116 while the drum rotates.

Figure 2:
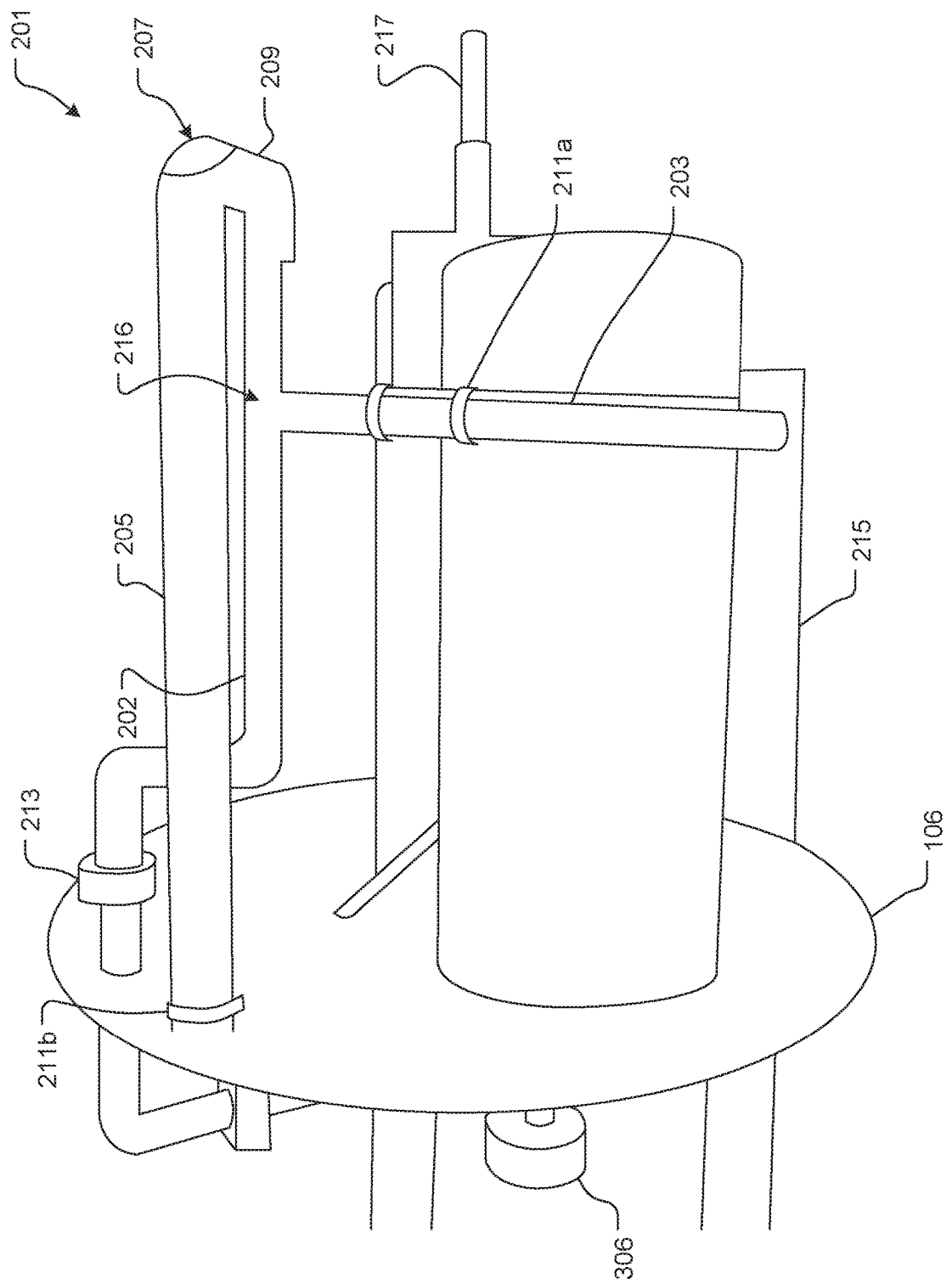
FIG. 2 is a side partial view of a first end of the water filtering system of FIG. 1 with the filter drum of FIG. 1 removed for clarity.

In FIG. 2, a side view depicts a venturi system 201 for use with the present invention. The venturi system is located inside the drum, and water pressure and flow to operate the venturi is supplied by the pump being fed by the system. Venturi system 201 is positioned at end 111 and therefore placed inside filter drum 115. In FIG. 2, the drum is removed for clarity.

In the preferred embodiment, venturi system 201 includes a venturi supply line/inlet 202 and a venturi suction pipe 203 extending to a venturi outlet pipe 205 used to flood the mesh screen. The outlet pipe 205 extends to one or more openings 207, which will be used to fill buckets (discussed later herein). A venturi diffuser 209 can further be incorporated herein. One or more mounts 211a-b can be used to secure the system in place. Further, a union 213 can be installed to allow for removability of the venturi system. During use, a low pressure point 216 is created within the pipes to create the venturi system. It should be appreciated that the venturi system operates on low pressure and the suction side of the venturi is supplied with filtered water from inside the screen.

As further shown in FIG. 2, apparatus 101 includes a suction pipe 215 integrally attached to the one or more pontoons, the suction pipe having an opening into the suction pipe. The apparatus also includes a wheel bearing shaft 217 to rotationally engage with the drum. The suction pipe provides for suction and structure for the apparatus. The one or more pontoons are mounted above the suction pipe, and all protrude into the rotating drum.

By placing the suction pipe below the pontoons directly in the water the weight of the water becomes 0 lbs. only the weight of the pipe that carry's the water has to be accounted for (laws of buoyancy). This feature aids in overcoming the limitations of other floating systems that are required to support the suction pipe above the waterline. It should further be appreciated and understood that when pumping from streams, rivers and ponds typically the cleanest place to extract the water is just below the surface, this is because the trash that needs to be separated is usually found at the surface because it floats or at the bottom because it sinks. This system design extracts the water from 6"-10" below the surface.

Another unique feature believed characteristic of the present application is that the system is expandable by connecting extensions together. It should be appreciated that some situations exist where the river or streams are very wide and water needs to be pumped from the center, due to water quality or streams that greatly fluctuate in their day to day flows.

Figure 3:
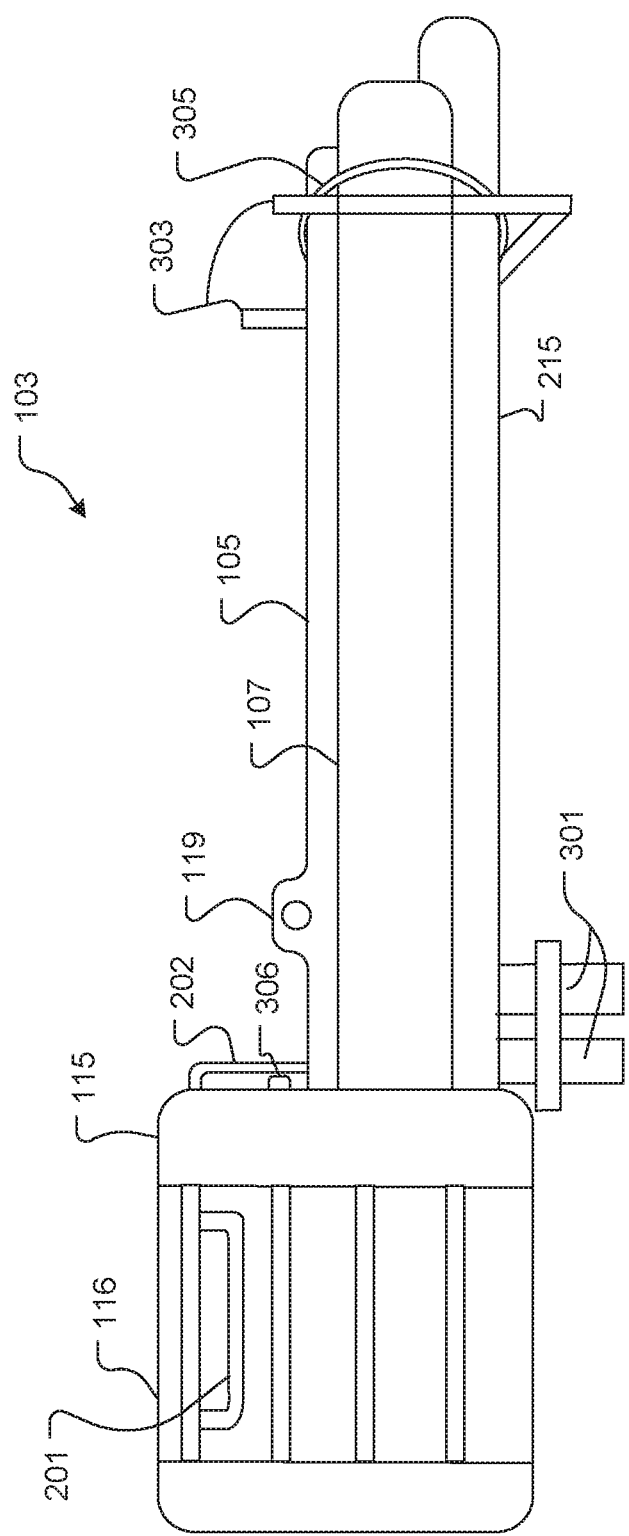
FIG. 3 is a side view of the water filtering apparatus of FIG. 1 removed from a water body.

In FIG. 3, a simplified side view of apparatus 103 is shown for clarity. As previously discussed, apparatus 103 includes a support system having one or more pontoons 105, 107 and a suction pipe 215 integrally attached to the one or more pontoons, the suction pipe having an opening. Further, the support system can include ring 119 and can include one or more ballasts 301 for support of the system on a ground surface, such as in shallow water, or also can provide for extra buoyancy. In some embodiments, the one or more ballasts are 4 inch ballasts and are placed just behind the open end of the screen. In the preferred embodiment, the apparatus 103 includes one or more rods 303 as part of a frame that can hold leveling weights, and one or more tail end structure plates 305. Lastly, the support system can include one or more rubber wheels 306.

As further shown in FIG. 3, the venturi supply line 202 extends into the filter drum 115, and the other components of the venturi system 201 are positioned within the drum.

Figure 4:
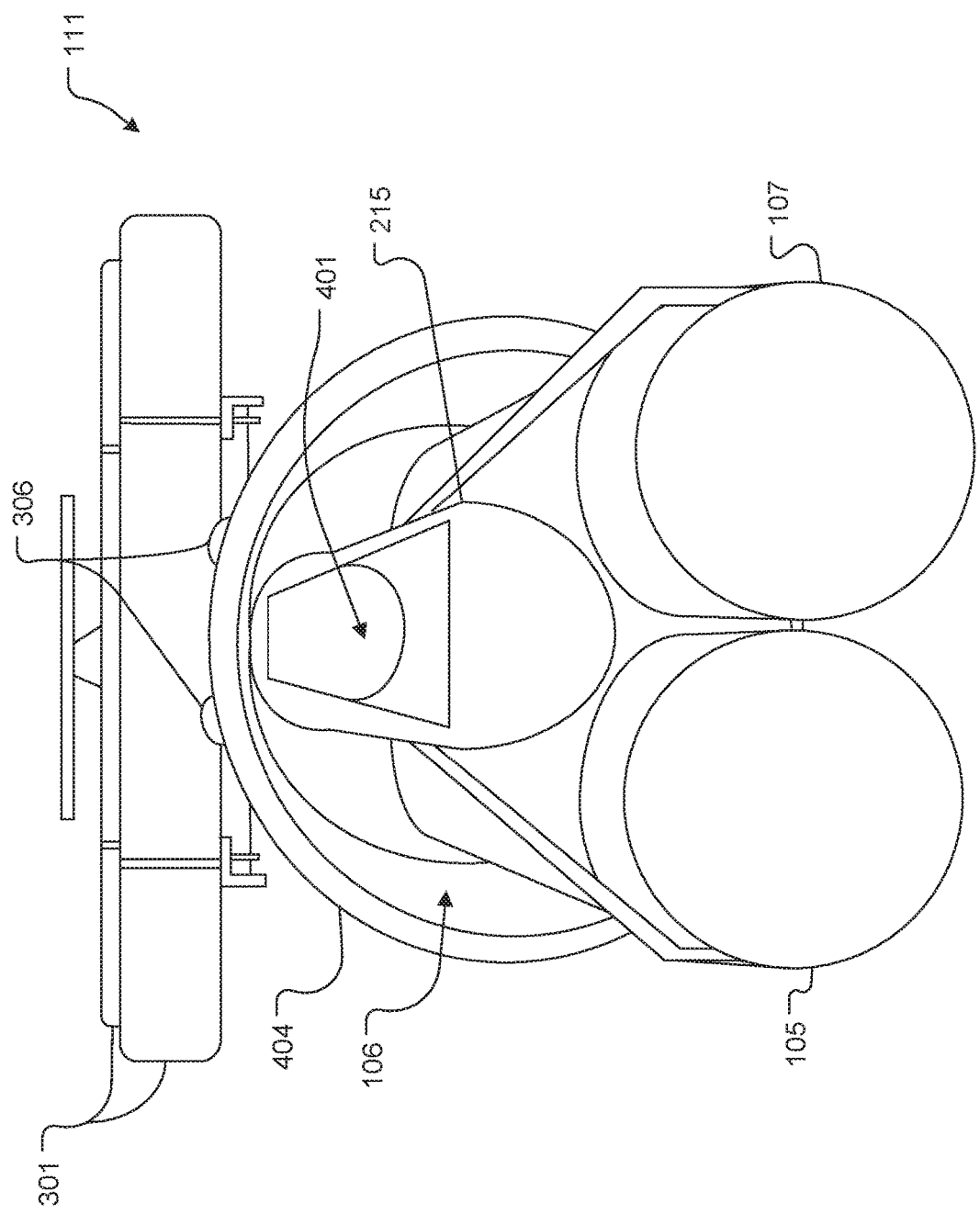
FIG. 4 is an end, inverted view of the first end of the water filtering apparatus of FIG. 1 with the venturi system removed for clarity.

In FIG. 4, an inverted view of end 111 is shown. As shown herein, suction pipe 215 includes opening 401. In the preferred embodiment, the opening 401 is tapered. The suction pipe with opening acts as the system inlet to feed filter water to the pump. As further shown, plate 106 can include a neoprene seal 403 for improved engagement with the filter drum.

Figure 5:
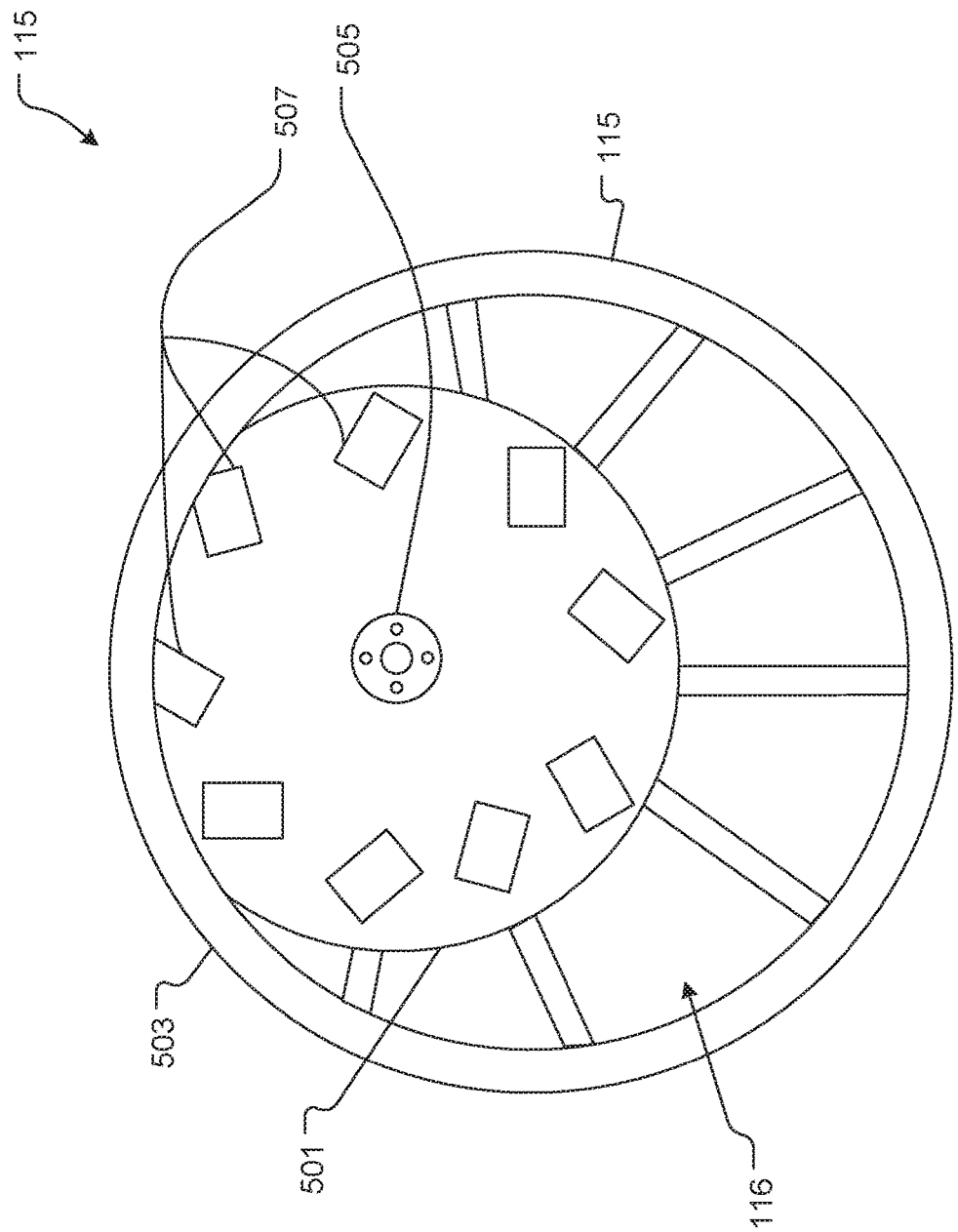
FIG. 5 is an end view of the filter drum of FIG. 1.

In FIG. 5, an end view of filter apparatus 113 is shown. As shown, the filter drum 115 has a filtered body 116, a closed end 501, and an open end 503. In the preferred embodiment, a wheel bearing assembly 505 is attached to the closed end and configured to engage with the wheel bearing shaft to secure the screen assembly in place. The attachment via the wheel bearing assembly provides for rotation of the drum. In the preferred embodiment, a plurality of buckets 507 are mounted to the closed end. During use, water is pulled through the venturi suction pipe via venturi pressure created inside the filter drum and further pushed to the discharge pipe and the split pipe to fall out of the split pipe and into the plurality of buckets; and gravitational pull of the plurality of buckets with water cause the filter drum to rotate about the wheel bearing assembly and the wheel bearing shaft.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An irrigation water filtering system, comprising:
    a support apparatus, having:
        one or more pontoons configured to provide buoyance to the system;
        a suction pipe integrally attached to the one or more pontoons, the suction pipe having an opening into the suction pipe;
        a plate integrally connected to the one or more pontoons and the suction pipe, the plate being substantially circular; and
        a wheel bearing shaft;
    a venturi system, having:
        a venturi suction pipe in fluid communication with the suction pipe;
        an outlet pipe positioned at an end of the venturi suction pipe, the outlet pipe having an opening;
        a venturi inlet pipe into a supply line, the inlet extending through the plate;
    a filtering assembly configured to engage with the plate around the venturi system, the filtering assembly having:
    a filter drum having a filtered body and a closed end;
    a wheel bearing assembly attached to the closed end and configured to engage with the wheel bearing shaft to secure the screen assembly in place;
    a plurality of buckets mounted to the closed end;
    a pump engaged with the suction pipe and configured to receive water therefrom;
    wherein the one or more pontoons and the suction pipe extend into the filter drum;
    wherein water is pulled through the venturi suction pipe via venturi pressure created inside the filter drum and further pushed to the outlet pipe to fall out of the opening in the outlet pipe and into the plurality of buckets; and
    wherein gravitational pull of the plurality of buckets with water cause the filter drum to rotate about the wheel bearing assembly and the wheel bearing shaft.

2. The system of claim 1, wherein the one or more pontoons are 10 inch by 10 feet PVC marine grade foam filled pontoons.

3. The system of claim 1, wherein the support apparatus further comprises:
    one or more four-inch ballasts secured on an underneath side of the one or more pontoons and the suction pipe;
    wherein the one or more four-inch ballasts secured perpendicular to the one or more pontoons.

4. The system of claim 1, wherein the support apparatus further comprises:
    one or more rubber wheels secured to an underneath side of the support apparatus.

5. The system of claim 1, wherein the opening into the suction pipe is tapered.

6. The system of claim 1, wherein the support apparatus further comprises:
    a ring attached to a top of one of the one or more pontoons, the ring being configured to provide a lift point for the system.

7. The system of claim 1, wherein the support apparatus further comprises:
    a frame having two rods extending upward and a base connecting the two rods underneath the one or more pontoons;
    wherein the two rods are configured to support counterweights associated with the system.

8. The system of claim 1, wherein the filter body has a wire mesh supported by the filter drum body.

9. The system of claim 1, wherein the support apparatus further comprises: a neoprene seal extending around a periphery of the plate.

* * * * *